United States Patent [19]

Stewart et al.

[11] 4,221,138

[45] Sep. 9, 1980

[54] DIFFERENTIAL HOUSING AND STRUCTURE

[76] Inventors: Basil G. Stewart, 819 Rice St.; James S. Stewart, 107 Greenacres Dr., both of Springfield, Ohio 45504

[21] Appl. No.: 867,045

[22] Filed: Jan. 5, 1978

[51] Int. Cl.³ .......................... F16H 57/02; F16H 1/40
[52] U.S. Cl. .......................................... 74/607; 74/713
[58] Field of Search .................. 74/710, 713, 606, 607

[56] References Cited

U.S. PATENT DOCUMENTS

| | | | |
|---|---|---|---|
| 691,908 | 1/1902 | Little | 74/607 X |
| 993,627 | 5/1911 | Wege | 74/606 X |
| 1,295,221 | 2/1919 | Simpelaar | 74/607 |
| 1,692,932 | 11/1928 | Ford | 74/607 X |
| 2,786,367 | 3/1956 | Rockwell | 74/713 |
| 3,074,285 | 1/1963 | Hausmann | 74/606 X |
| 3,406,592 | 10/1968 | Von Kaler | 74/710 |
| 3,901,103 | 8/1975 | Hufstader | 74/607 X |

Primary Examiner—Samuel Scott
Assistant Examiner—Gerald Anderson
Attorney, Agent, or Firm—Jerome P. Bloom

[57] ABSTRACT

A differential features an inexpensive lightweight housing formed of sheet material the rugged construction of which makes it extremely resistant to damage and distortion in use. The embodiment illustrated comprises a housing the peripheral wall of which is defined by a tube segment having a generally rectangular configuration. Each end of the tube segment is capped by a plate centrally contoured about a central aperture to form thereon a cup-like projection the configuration of which is that of a conically tapered, outwardly and axially directed shell the apex of which is truncated. In the case of each end plate the conically tapered shell-like projection seats and nests therein a complementarily shaped sleeve type bearing set in place by offsets of that portion of the plate which defines its base. The respective end plates and their contained bearings, as so paired, each accommodate the projection therethrough of one of the differential shafts. The adjacent ends of said shafts mount gears positioning inwardly of the tube segment to mesh with a pair of transversely spaced transfer gears. The latter freely rotate on a shaft fixed transversely of the tube segment without the need for and benefit of separate fasteners.

The differential housing is shown in two forms. In the one case the housing is a single plate segment wrapped into a tubular configuration. In the other it is formed of two identical substantially U-shaped stampings the open ends of which are joined in an overlapped relation by means of offsets to give the so-combined structure not only a generally rectangular configuration but extremely high strength. Strength is added to the single plate form of the housing by application of a shallow U-shaped stamping to opposite inner wall surface portions thereof.

14 Claims, 7 Drawing Figures

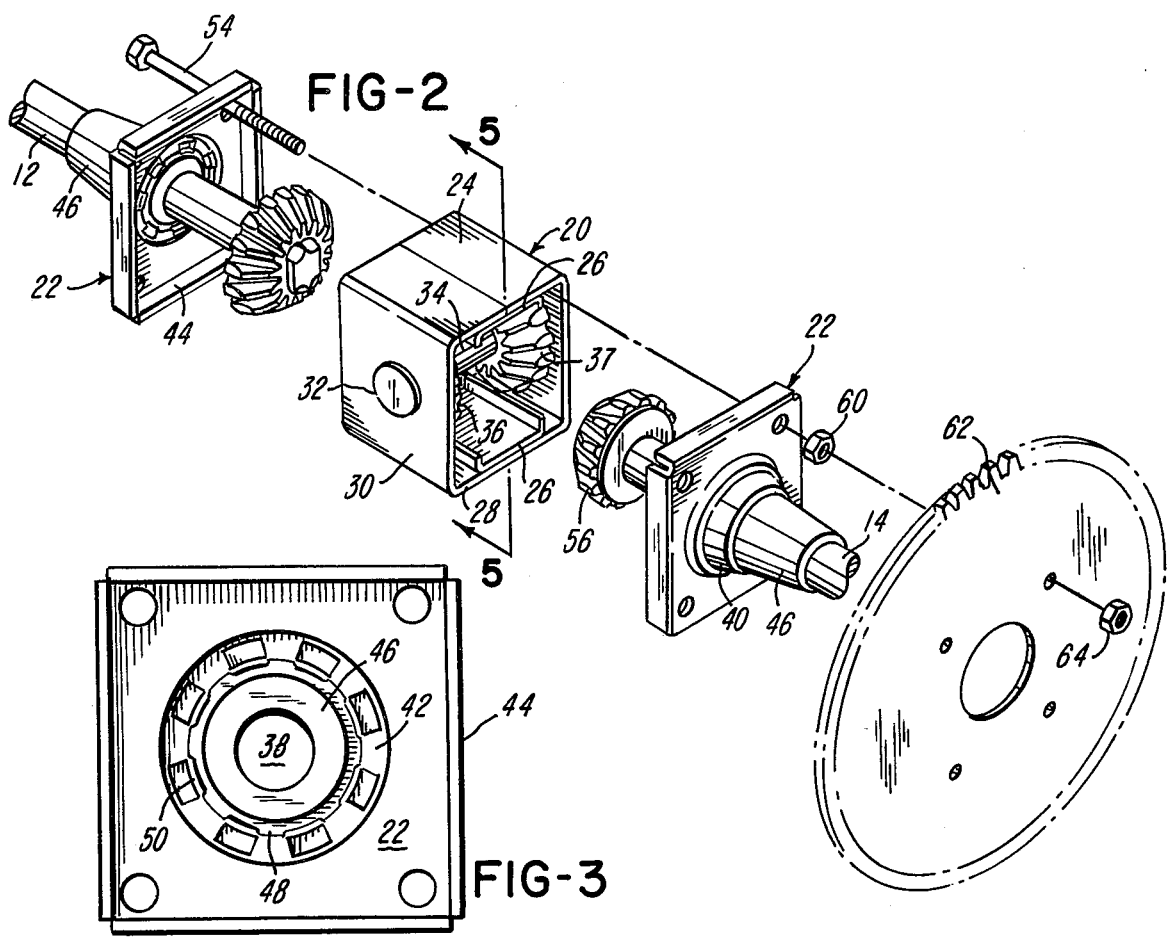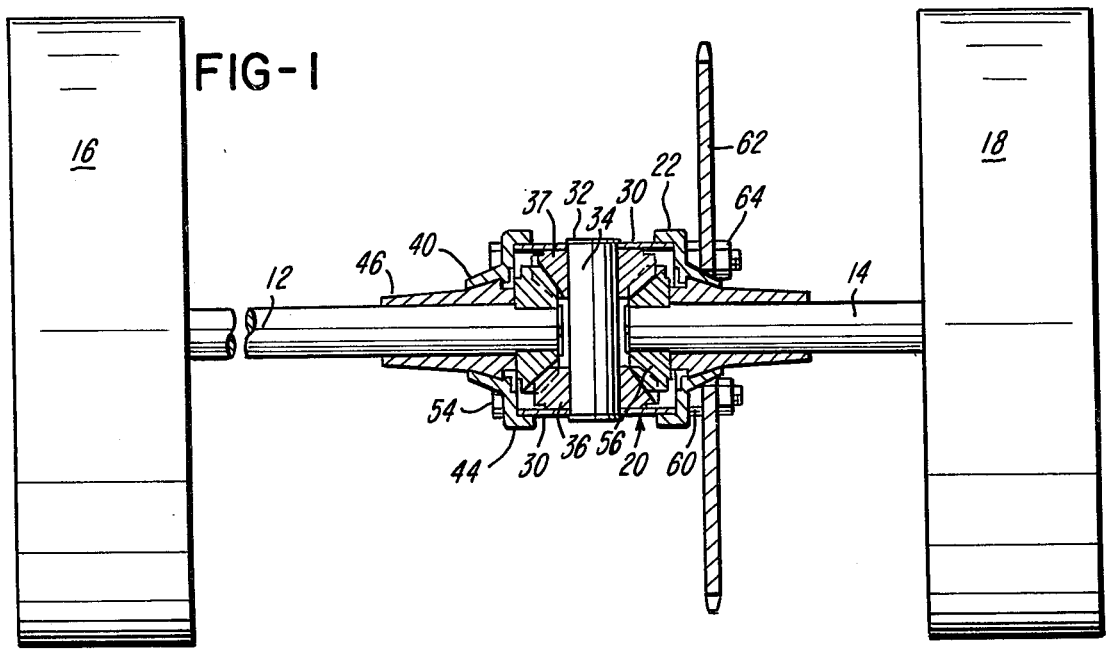

DIFFERENTIAL HOUSING AND STRUCTURE

BACKGROUND OF THE INVENTION

This invention relates to a new and improved construction of a differential, particularly of the differential housing and its component parts. It will be particularly illustrated with reference to its application to the transaxle assembly of a riding mower. However, such an application is not to be construed as limiting, since such is obviously not the case.

Prior art differentials have followed the pattern of being comprised, in the main, of heavy and expensively fabricated parts and a multitude of connectors, retainers and seals. The complexity and number of parts and their assembly have led to increasingly higher initial costs and more demanding inspection and maintenance procedures.

The improvements of the present invention, by contrast, enable a lightweight yet rugged construction for a differential which minimizes its costs and the number of its parts, maximizes its durability and minimizes its maintenance requirements.

Prior art patents specifically pertinent to the features of construction deemed novel to the present invention are not known.

SUMMARY OF THE INVENTION

Preferred embodiments of the present invention are made of sheet material and feature a differential housing comprised of a tube segment and capping end plates which are simple stampings. The differential gears which position within the housing are conventional except that they are cast of powdered metal and their mount does not require keys or other fasteners. The shaft which mounts the transfer gears extends transversely through and bridges the tube segment at its longitudinal center and is retained in place by an upset of each of its respective outwardly projected ends.

Each capping end plate is formed with an outwardly projected cup-like formation at its center nesting a bearing for a differential shaft which projects through an aperture in the plate centered in the outer extremity of its cup-like formation. Portions of this projection are offset to serve as retainers for the contained bearing.

The end plates are connected by through bolts and applied nuts to seal the respective open ends of the tube segment and serve to mount a drive gear in connection with the differential housing, to one end thereof. The stress and damage resistant configuration of the housing is enhanced in one embodiment thereof by the welding of longitudinally extending platelike stampings to opposed inner wall surface portions of the tube segment which are formed as channel elements having a shallow U-shape in cross section. A preferred embodiment of the housing is formed of two identical generally U-shaped stampings the projected extremities of the arm portions of which are positioned in an adjacent overlapped relation. By reason of an offset in one arm thereof, in bringing the U-shaped stampings together they inherently form a structure defining a generally rectangular tube segment.

It is a primary object of the invention to provide a differential embodying features of improvement in its component parts which is simple and inexpensive to fabricate, more efficient and satisfactory in use, adaptable to a wide variety of applications and unlikely to malfunction.

Another object is to provide a housing for a differential which is formed of lightweight sheet material yet rugged in its construction and highly resistant to damage or distortion in use.

A further object is to provide a unique differential housing comprised of a tube segment capped to either open end by a stamped plate the center of which is formed as an outwardly directed cup-shaped projection nesting a bearing in line with an aperture in its projected extremity which accommodates the projection therethrough and a bearing rotation therein of a differential shaft.

An additional object is to provide a differential the drive gears and bearings of which are made of powdered metal and retained to their housing without the need for keys or other separate fasteners.

Another object is to provide a differential housing the peripheral wall of which is a strip of sheet material formed into a generally rectangular tube segment capped and reinforced by plate-like stampings which lend the housing composite considerable strength to resist distortion and/or damage under load.

Another object is to form a differential housing the peripheral wall of which is economically comprised of two generally identical U-shaped stampings which are welded together.

A further object is to provide a differential and component parts thereof possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a top plan view illustrating a differential in accordance with the invention in horizontal cross section and in a transaxle assembly;

FIG. 2 is an exploded view to further illustrate details of the differential of FIG. 1 as applied to the transaxle assembly, the differential being shown in a vertical elevation thereof;

FIG. 3 is a view of the inner face of one of the two identical end plates forming part of the differential housing;

Like parts are indicated by similar characters of reference throughout the several views.

Figure 4:
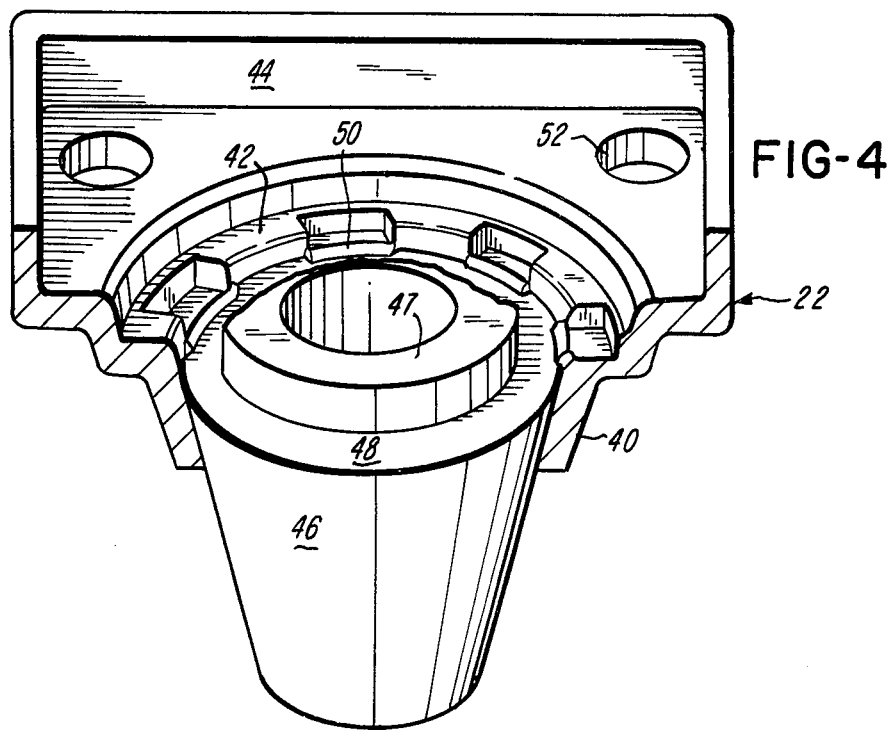
FIG. 4 is a perspective view of the end plate of FIG. 3 broken away in part and illustrating the embodiment therein of a sleeve-type bearing for a differential shaft comprising one axle portion of the assembly illustrated in FIG. 1.
Figure 5:
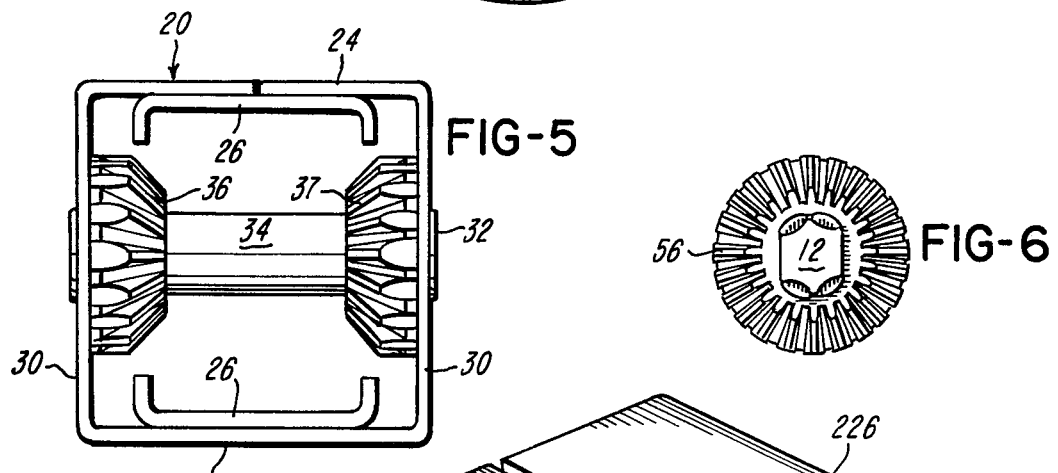
FIG. 5 is a view taken on line 5—5 of FIG. 2.
Figure 6:
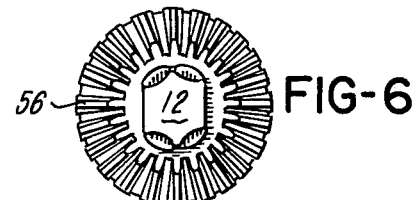
FIG. 6 is an end view illustrating the manner in which a drive gear of the differential is connected to its shaft without the need for separate keys or fasteners.

In its illustrated embodiment the invention features are disclosed in a differential forming part of a transaxle assembly of a riding mower. In the transaxle assembly the differential 10 provides an operative connection between the spaced inner ends of axle portions 12 and 14 the remote ends of which respectively mount the mower drive wheels 16 and 18.

The differential shown in FIGS. 1-6 of the drawings comprises a shell-like housing the peripheral wall of which is defined by a tube segment 20 which has a generally rectangular cross section. The ends of the housing are provided by identical stampings having a general rectangular configuration, applied as caps 22 to the respective open ends of the tube segment 20.

The tube segment 20 is formed as a continuous wall structure by taking a single rectangular segment of sheet steel and bending the same into a rectangular configuration, in the process of which the remote ends of the strip are abutted and welded together. In the case illustrated the line of welding is established in a centered longitudinally extending relation to what may be considered the upper wall portion 24 of the tube segment 20.

Welded to, longitudinally of and coextensive in length with the inner surface of the upper wall portion 24 is the base of a channel shaped stamping 26 the cross section of which has the shape of a shallow "U", the short legs of which project perpendicularly of the upper wall portion 24 and in the direction of the bottom wall portion 28 of the tube segment 20. The lateral extent of the element 26 provides that the legs thereof respectively position in closely spaced parallel relation to the inner wall surfaces of the sides 30 of the tube segment 20. An identical stamping 26 is similarly fixed and positioned on the inner surface of the bottom wall portion 28 to have the short leg portions thereof project inwardly so as to be respectively in planes commonly occupied by the respective legs of the upper element 26. The presence of stampings 26 enhances the stress and damage resistant configuration of the housing.

Centered between the vertical and longitudinal limits of the tube segment 20 is a pivot shaft 34. The respective ends of the shaft 34 extend through transversely aligned apertures centered in the side wall portions 30 of the tube segment 20. In the application thereof, the pivot shaft 34 mounts for free rotation thereon, between the side walls 30, a pair of conically configured transfer gears 36 and 37. When in place, the remote extremities of the shaft 34 respectively project slightly outward of the respective side wall portions 30 and these outwardly projected ends are then upset and thereby expanded to produce thereon peripheral flange-like projections 32. In the process the projections 32 are each forced into a connected sealing engagement with the adjacent outer wall surface portion of the tube segment 20. A seal is thereby provided for each of the apertures through which the shaft 34 projects.

Each of the stampings 22 is a housing end plate formed from a rectangular segment of sheet steel cut to have a rectangular notch in each of its corners. Each end plate 22 is provided with a central aperture 38 and the central area thereof immediately about and including the central aperture is offset to provide it with a cup-like, outwardly and axially directed projection 40. The configuration of the projection 40 is that of a conically tapered shell which is truncated at its convergent projected apex and has an annular, radial skirt 42 at its base. The skirt 42 is also slightly offset from the base plane of that portion of the plate 22 which rims and forms the reference plane of the offset. The outer peripheral edge of the plate 22 has a skirt-like rectangular flange 44 the formation of which is facilitated by the corner notches in the base segment of sheet steel from which the end plate is formed. The flange 44 projects in a direction opposite the previously described offset.

Nesting in and immediately contained by the projection 40 of each end plate 22 is a sleeve type bearing 46 the major extent of the outer peripheral surface of which has a conical taper complementary to that of the inner surface of the projection. The bearing 46 is molded of powdered metal and the axial length of its conically tapered portion is such that its convergent extremity projects through and beyond the truncated apex of the projection 40. The innermost or base end of that portion of the sleeve 46 the outer configuration of which is conical is axially extended by a cylindrical tubular projection 47 the outer diameter of which is less than that of the base of the conically configured portion of the sleeve and the inner diameter of which is uniformly maintained the length of the sleeve. The configuration of the sleeve, thus formed, provides an annular shoulder 48 on the base end of that portion of the sleeve the outer surface of which is conically shaped which lies immediately of the skirt 42 and in surrounding relation to the base end of the projection 47.

When a sleeve 46 is nested in the offset of each end plate 22, force is applied to the innermost face of the skirt 42 to offset portions of the plate material and produce projections thereof to overlap the outer peripheral portion of shoulder 48. The overlapping projections so formed resemble a circularly spaced series of lugs 50 which fix the bearing 46 so as to be embodied in and to form a part of the end plate 22, fixed against axial movement with reference thereto.

Each end plate 22 has a series of four rectangularly spaced apertures 52 for accommodating connecting bolts 54.

In assembly thereof each of the axle portions 12 and 14 has its inner end projected through the central aperture 38 of one of the end plates 22, whereupon there is applied to its inner extremity, which includes diametrically opposite flats on its periphery, a differential gear 56 which has been molded of powdered metal. The aperture in the gear 56 which accommodates the flattened end of the shaft (12 or 14) has a complementary shape for a press fit thereon, following which portions of so connected parts are offset to produce an interlocked relation therebetween in a manner believed obvious. The respective gears 56 are then placed in mesh with the transfer gears 36 and 37 at opposite sides thereof, by application through the respective ends of the tube segment 20, whereupon the end plates 22 which bear on the respective axle portions 12 and 14 through the medium of the sleeves are slid into capping relation to the respective open ends of the tube segment. The plates 22 are interconnected by bolts 54 which extend through the tube segment 20 and aligned apertures in the end plates to have the heads thereof abut the outer surface of one end plate and nuts 60 threaded on the projected extremities thereof clamp to the remote outer surface of the other end plate. On turning up the nuts 60, the plates 22 are clamped in a sealing, covering, relation to the opposite ends of tube segment 20, the latter of which is end loaded to provide a differential housing of extremely rugged yet lightweight construction.

Beyond the nuts 60 the projected ends of the bolts 54 are shown to project through apertures in and to mount an annular sprocket 62 which positions immediately about the projected end of the shell-like conical projection 40 of the adjacent end plate 22. Nuts 64 are applied to clamp the sprocket 62 to nuts 60 and in driving relation to the differential housing.

From the foregoing it will be seen that the differential housing may be economically fabricated to have itself a shell-like configuration the walls of which are of inexpensive sheet material yet afforded with a design and configuration to give it great strength to resist torsional and other stresses in use. The end plate construction is also unique in its plate formed configuration and embodiment therein of a bearing facilitating assembly and maintenance procedures as well as giving the differential a better operating function and extended life. Take particular note of the fact that the only elements of the differential constituting fasteners are the bolts and nuts used to connect the housing end plates.

The invention has been illustrated only by way of example and it will be seen the features of its housing may be embodied utilizing other than sheet steel and that such is comprehended within the spirit and scope of the present disclosure.

Details of the drive mechanism for the differential are not herein described since the same is not necessary for an understanding of the present invention.

Figure 7:
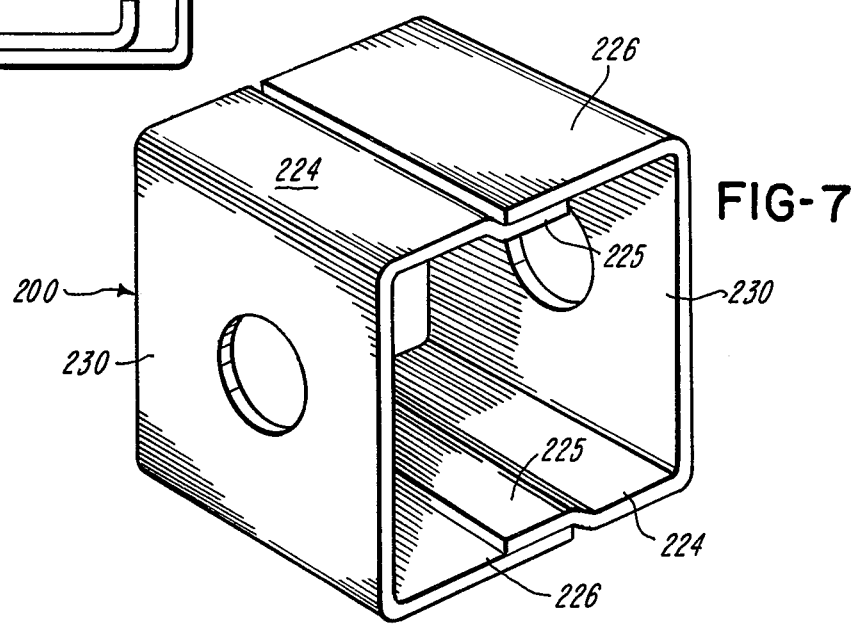
FIG. 7 shows a preferred modification of the differential housing illustrated in FIGS. 1-6.

FIG. 7 of the drawings shows a tube segment 200 which may be substituted for the tube segment 20. The tube segment 200 is comprised of two identical U-shaped stampings 230. Each stamping 230 includes parallel arms 224 and 226 which project perpendicular to a centrally apertured base. The arm 224 has its outer end portion 225 offset slightly in the direction of the arm 226. The degree of this offset permits the two stampings 230 to have their open ends position in a relatively aligned facing relation so as to provide that the arm portion 226 of each stamping rides over the outer surface of the adjacent end portion 225 of the arm 224 of the other stamping. The so-overlapped arm portions of the stampings 230 are welded together. This welded overlapped relation of the two parts forming the tube segment 200 is simple to achieve and provides a unitized structure which is essentially continuous at its outer surface, in a circumferential sense. As thus economically provided the preferred embodiment of a peripheral wall structure for the differential housing of the embodiment of FIGS. 1-6 is not only easy to fabricate but affords an optimally strengthened housing. In utilizing the structure of FIG. 7 one does not require the channel-shaped elements 26. The central apertures in the base portions of the U-shaped elements 230 accommodate the transfer shaft 34 in a manner similar to that previously described with reference to FIG. 5 of the drawings.

As indicated previously, an embodiment of the invention utilizing the tube segment of FIG. 7 will differ from the embodiment of FIGS. 1-6 only with respect to the details of the construction of the tube segment per se.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

While reference is herein made to a particular orientation of the differential, it is to be understood that this is solely for purposes of description, since the same is obviously not so limited or fixed as to its requirements.

The embodiments of the invention in which an exclusive property or privilege is claimed are defined as follows:

1. A differential including a shell-like housing comprising a multi-lateral tubular body the length of which is unbroken in a transverse sense, a separable plate-like stamping of sheet material capping each of the respective ends of said tubular body, each said stamping having a central aperture, said stampings being interconnected to end load said body and draw said plate-like stampings into a capping sealing relation to the respective open ends of said body, bearing means within and lining each said central aperture and contained in a fixed position with respect to the stamping to which it is applied by portions of said stamping, said bearing means being arranged to accommodate the projection therethrough of a differential shaft and provide a seal with the differential shaft, a differential gear mounted on the differential shaft within said housing, and a transfer shaft within and extending transversely of said body and into opposite wall portions thereof, said transfer shaft and said wall portions being arranged to per se provide a connection therebetween which fixes said transfer shaft relative said body, said transfer shaft mounting for free rotation thereon transfer gear means which mesh with the gear means within said housing connecting to the applied differential shafts.

2. A differential as in claim 1 wherein said tubular body is fabricated of sheet metal shaped to define a tube of rectangular cross section, adjacent opposite free edges of the sheet metal being sealed together in a line extending the length of said tubular body to thereby have said body form the peripheral wall of said housing.

3. Apparatus as in claim 1 wherein each said stamping is a plate including an offset central portion having a cup-like configuration the projected end of which includes said central aperture of the stamping, said bearing having an annular cross sectional configuration and nesting, at least in part, in said offset portion to position coaxial with said central aperture and said bearing is confined to inhibit its axial movement with respect to said central aperture by portions of said stamping which are integral therewith.

4. Apparatus as in claim 3 wherein said offset has a conical shell-like configuration the truncated apex of which rims said aperture and said bearing is a sleeve the outer peripheral configuration of which has a portion having a shape complementary to that of said offset cupped therein and portions of said stamping adjacent the base of said offset are radially offset to contain said bearing in a fixed relation to and so as to form an integrated part of said stamping.

5. Apparatus as in claim 4 wherein said tubular body and each said stamping is rectangular in cross section, each said stamping is formed to nest one of the open ends of said tubular body and said stampings and said body are end loaded by bolts which extend through said tubular body.

6. A differential including the apparatus of claim 1 and comprising in addition thereto a pair of oppositely positioned differential gears each of which is located within said tubular body in mesh with said transfer gear means, to a respectively opposite side thereof, said differential gears respectively mounting in connected relation to a differential shaft projected through the bearing and central aperture in one of said stampings to form a seal of said apertures.

7. Apparatus as in claim 6 wherein said differential gears are fixed to said differential shafts by the shaping thereof per se and without the benefit of separate fastening means and said gears are of powdered metal.

8. Apparatus as in claim 1 including segments of sheet-like material fixed to, longitudinally of and at circumferentially spaced locations of the inner surface of said tubular body, said segments being substantially coextensive in length with said tubular body.

9. Apparatus as in claim 8 wherein said segments include base portions which seat to said inner surface of said body and portions which project inwardly thereof and coextensive with their longitudinal extent.

10. Apparatus as in claim 9 wherein said segments are in strip form and U-shaped in cross section.

11. Apparatus as in claim 1 wherein said transfer shaft extends through transversely aligned apertures in said body intermediate its ends, said transfer shaft mounts two transfer gears for free rotation thereon and relative thereto within said body and each of the ends of said transfer shaft is projected slightly outward of said tubular body and upset to form an expanded head on said transfer shaft which is forced into said tubular body per se to join said body and seal the aperture through which the transfer shaft projects.

12. A differential housing the peripheral wall of which is continuous, said housing being comprised of two segments of sheet metal which are generally U-shaped in cross section and have their free ends joined and sealed together in an overlapped interconnected relation to form a generally rectangular integral tube segment opposite wall portions of which are reinforced, a transfer shaft within and extending transversely of said tube segment and into apertures in opposite side wall portions thereof, said transfer shaft having portions thereof which per se are joined directly to portions of said opposite wall portions per se to fix said shaft relative said tube segment without the requirement for separate fasteners, said transfer shaft mounting for free rotation thereon a pair of transfer gears, end caps for said tube segment formed of sheet metal and applied to the respective open ends of said tube segment, said end caps embodying integrated bearing means and said housing accommodating differential gears to respectively opposite sides of said transfer gears and in mesh therewith, said end caps each having a central aperture accommodating the projection therethrough of a differential shaft to mount one of the differential gears in said housing for drive thereof.

13. Apparatus as in claim 12 wherein each of said U-shaped segments of sheet metal is a stamping including generally parallel arms which project from and perpendicular to its base and have the outer end of one of said arms offset towards the other whereby to provide that the open ends of said segments of sheet metal may be slip fit into a relatively overlapped relation and as so positioned interconnected to form said generally rectangular tube segment.

14. A differential including a shell-like housing comprising a multi-lateral tubular body the length of which is unbroken in a transverse sense, a separable plate-like stamping of sheet material capping each of the respective ends of said tubular body, each said stamping having a central aperture, said stampings being interconnected to end load said body and draw said plate-like stampings into a capping sealing relation to the respective open ends of said body, bearing means within and lining each said central aperture and contained in a fixed position with respect to the stamping to which it is applied, said bearing means being arranged to accommodate the projection therethrough and form a seal with a differential shaft an end of which mounts a differential gear within said housing, and a transfer shaft within and extending transversely of said body and mounted in opposite wall portions thereof, said transfer shaft and said wall portions being arranged to per se provide a connection therebetween which fixes said transfer shaft relative to said body, and freely rotating transfer gear means mounted on said transfer shaft which mesh with the gear means within said housing connecting to the applied differential shafts said bearing means lining each said central aperture being a sleeve installed in and projecting through and beyond the central aperture in the stamping in which it is embodied, said stamping being deformed to have a portion thereof containing said central aperture relatively project at a surface thereof most remote from said tubular body and form a cup-like depression in the surface thereof most adjacent said tubular body and said sleeve therein having a cylindrical inner surface for bearing contact with a differential shaft portion which projects therethrough and having an exterior surface at least a portion of which is shaped in complementary fashion to the configuration of said cup-like depression in said closure element to seat therein and be limited thereby against endwise movement thereof in one direction and means formed integral with each said stamping at the said adjacent surface of said stamping limiting endwise movement of said sleeve which is embodied therein in the opposite direction.

* * * * *